US007649962B2

(12) United States Patent
Ishii (10) Patent No.: US 7,649,962 B2
(45) Date of Patent: Jan. 19, 2010

(54) PHASE ERROR CORRECTION CIRCUIT

(75) Inventor: Tatsuji Ishii, Osaka (JP)

(73) Assignee: Panasonic Corporation, Osaka (JP)

( * ) Notice: Subject to any disclaimer, the term of this patent is extended or adjusted under 35 U.S.C. 154(b) by 327 days.

(21) Appl. No.: 10/578,005

(22) PCT Filed: Aug. 4, 2005

(86) PCT No.: PCT/JP2005/014295

§ 371 (c)(1),
(2), (4) Date: Apr. 6, 2007

(87) PCT Pub. No.: WO2006/027916

PCT Pub. Date: Mar. 16, 2006

(65) Prior Publication Data

US 2007/0274416 A1    Nov. 29, 2007

(30) Foreign Application Priority Data

Sep. 9, 2004    (JP)    ............................ 2004-262202

(51) Int. Cl.
*H04L 27/14*    (2006.01)
(52) U.S. Cl. ...................................... 375/324
(58) Field of Classification Search ................ 375/324, 375/321, 326, 329, 327, 294; 455/180.3; 329/325, 360
See application file for complete search history.

(56) References Cited

U.S. PATENT DOCUMENTS

| 5,841,820 | A | 11/1998 | Krishnamurthy et al. |
| 6,067,329 | A | 5/2000 | Kato et al. |
| 6,816,716 | B2* | 11/2004 | Shohara .................... 455/196.1 |
| 2004/0135929 | A1 | 7/2004 | Hoda et al. |
| 2005/0070237 | A1* | 3/2005 | Moriai et al. ............ 455/151.1 |

FOREIGN PATENT DOCUMENTS

| JP | 8-242394 A | 9/1996 |
| JP | 9-8856 A | 1/1997 |
| JP | 9-98198 A | 4/1997 |
| JP | 10-70580 A | 3/1998 |
| JP | 11-136301 A | 5/1999 |
| JP | 2000-507783 A | 6/2000 |
| JP | 2001-86175 A | 3/2001 |
| JP | 2001-358785 A | 12/2001 |
| JP | 2002-051092 | 2/2002 |
| JP | 2004-179928 A | 6/2004 |

OTHER PUBLICATIONS

Japanese Notice of Reasons for Rejection, w/ English translation thereof, issued in Japanese Patent Application No. JP 2006-535075 dated on Oct. 28, 2008.

* cited by examiner

*Primary Examiner*—Khai Tran
(74) *Attorney, Agent, or Firm*—McDermott Will & Emery LLP (57) ABSTRACT

A phase error correction circuit includes a complex phase rotator for multiplying an input VSB (vestigial-sideband) signal by a phase correction signal and outputting a resultant signal, a specific frequency component elimination filter for eliminating a specific frequency component from the signal output from the complex phase rotator and outputting a resultant signal, a waveform equalizer for performing waveform distortion correction to the signal output from the specific frequency component elimination filter and outputting a resultant signal and a phase correction signal generator for detecting a phase error based on the signal output from the waveform equalizer and outputting a complex signal corresponding to the detected phase error as the phase correction signal.

11 Claims, 5 Drawing Sheets

*Prior Art*

FIG.5

*Prior Art*

PHASE ERROR CORRECTION CIRCUIT

RELATED APPLICATIONS

This application is the U.S. National Phase under 35 U.S.C. § 371 of International Application No. PCT/JP2005/014295, filed on Aug. 4, 2005, which in turn claims the benefit of Japanese Application No. 2004-262202, filed on Sep. 9, 2004 the disclosures of which Applications are incorporated by reference herein.

TECHNICAL FIELD

The present invention relates to a demodulator for demodulating a VSB (vestigial-sideband) modulated signal, and more particularly relates to a phase error correction circuit.

BACKGROUND ART

Figure 4:
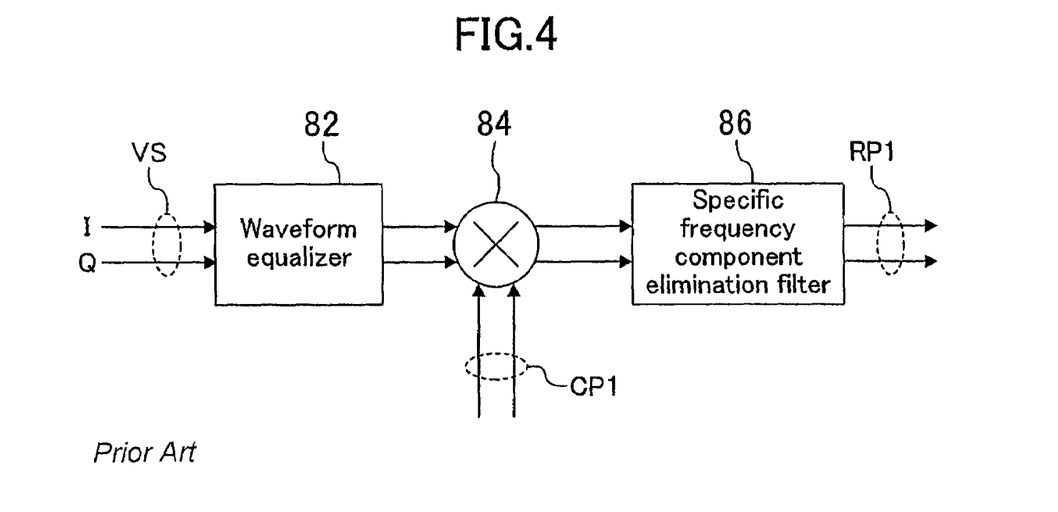
FIG. 4 is a block diagram illustrating a configuration of a known phase error correction circuit.

FIG. 4 is a block diagram illustrating a configuration of a known phase error correction circuit (for example, see Patent Reference 1). The circuit of FIG. 4 includes a waveform equalizer 82, a complex phase rotator 84 and a specific frequency component elimination filter 86.

The waveform equalizer 82 corrects a waveform distortion of a VSB signal VS which is a baseband signal and has been analog-digital converted, and outputs the VSB signal to the complex phase rotator 84. The complex phase rotator 84 multiplies, in terms of a complex signal representation, an output of the waveform equalizer 82 by a complex conjugate signal CP1 of a detected phase error. Thus, the output signal of the waveform equalizer 82 is reversely rotated by an amount corresponding to the phase error, thereby reconstructing an original VSB baseband signal. The specific frequency component elimination filter 86 eliminates a specific frequency component included in a NTSC (national television system committee) signal and the like from the signal which has been phase corrected and output from the complex phase rotator 84, and outputs a resultant signal.

Figure 5:
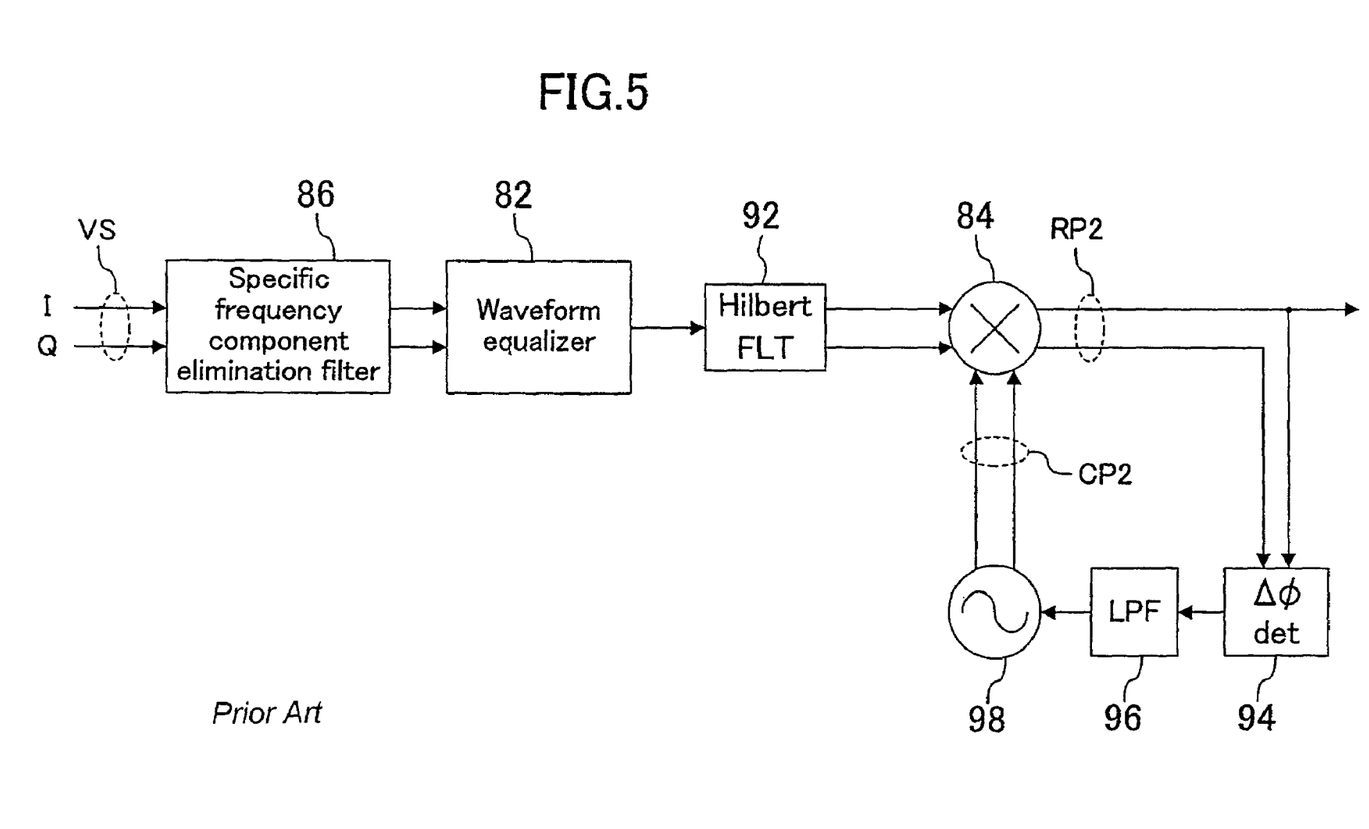
FIG. 5 is a block diagram illustrating another configuration of the known phase error correction.

FIG. 5 is a block diagram illustrating another exemplary configuration of a known phase error correction circuit. The circuit of FIG. 5 includes, in addition to components described in FIG. 4, a Hilbert transformer 92, a phase error detector 94, a low pass filter 96 and a complex signal generator 98.

The specific frequency component elimination filter 86 eliminates a specific frequency component from the VSB signal VS and outputs a resultant signal. The waveform equalizer 82 corrects a waveform distortion of the VSB signal from which the specific frequency component has been eliminated and a resultant real signal to the Hilbert transformer 92. The Hilbert transformer 92 generates a complex signal from an output of the waveform equalizer 82 and outputs a resultant signal to the complex phase rotator 84.

The complex phase rotator 84 multiplies, in terms of complex signal presentation, an output of the Hilbert transformer 92 by a complex conjugate signal CP2 of a detected phase error and outputs a complex signal RP2 from which a phase error has been eliminated. The phase error detector 94 detects a phase error of the complex signal RP2. The detected phase error is smoothed by the low pass filter 96 and then, based on a resultant smoothed signal, the complex signal generator 98 generates the complex conjugate signal CP2.

(Patent Reference 1) Japanese Patent Laid-Open Publication No. 8-242394

DISCLOSURE OF THE INVENTION

Problems that the Invention is to Solve

However, in the configuration of FIG. 4, an output of the waveform equalizer has to be a complex signal. The waveform equalizer normally includes a filter with a large number of taps. To output a complex signal, the number of filters has to be increased, compared to the case where a real signal is output. As a result, a circuit size of the waveform equalizer is largely increased.

In the configuration of FIG. 5, an output of the waveform equalizer is a real signal and thus a circuit size can be small. However, a quadrature component of a complex signal is generated by the Hilbert transformer. That is, a complex signal is generated from a real signal having a phase error. If phase correction is performed to such a complex signal, degradation of a frequency component around a DC (direct current) due to an asymmetric frequency characteristic of a VSB signal is caused, so that phase error correction can not be correctly performed. As a result, the degree of degradation of a received signal of a demodulator using the phase error correction circuit of FIG. 5 is increased.

The present invention has been devised to perform highly precise phase error correction and suppress increase in circuit size of a phase error correction circuit.

Solution to the Problems

A phase error correction circuit according to the present invention includes: a complex phase rotator for multiplying an input VSB (vestigial-sideband) signal by a phase correction signal and outputting a resultant signal; a specific frequency component elimination filter for eliminating a specific frequency component from the signal output from the complex phase rotator and outputting a resultant signal; a waveform equalizer for performing waveform distortion correction to the signal output from the specific frequency component elimination filter and outputting a resultant signal; and a phase correction signal generator for detecting a phase error based on the signal output from the waveform equalizer and outputting a complex signal corresponding to the detected phase error as the phase correction signal.

Thus, phase correction is performed to an input VSB signal, so that highly precise phase error correction can be performed.

Moreover, in the phase error correction circuit, it is preferable that the waveform equalizer receives a complex signal from the specific frequency component elimination filter and outputs a real signal as the resultant signal obtained from the waveform distortion correction.

Thus, the waveform equalizer does not have to output a complex signal, so that increase in circuit size of the waveform equalizer can be suppressed.

It is preferable that the phase correction signal generator includes a Hilbert transformer for performing Hilbert transform to the signal output from the waveform equalizer and outputting a complex signal obtained from the Hilbert transform and detects the phase error based on the Hilbert-transformed complex signal.

Thus, even though the waveform equalizer does not output a complex signal, a phase difference can be obtained based on a complex signal.

It is preferable that the phase correction signal generator further includes: a phase error detector for detecting the phase error based on the Hilbert-transformed complex signal and outputting the detected phase error; a low pass filter for smoothing the detected phase error output from the phase error detector and outputting the smoothed signal; and a complex signal generator for generating a complex signal corresponding to the signal output from the low pass filter and outputting the generated complex signal as the phase correction signal.

It is preferable that the phase error detector includes: a slicer for estimating an original signal symbol value of the VSB signal from an in-phase component of an input complex signal; a subtracter for obtaining a difference between an in-phase component of the Hilbert-transformed complex signal and the estimated signal symbol value output from the slicer; and an integrator for obtaining a product of the difference output from the subtracter and a quadrature component of the Hilbert-transformed complex signal and outputting a resultant product as the phase error.

It is preferable that the phase error correction circuit further includes a small phase error corrector for detecting a phase error based on the Hilbert-transformed complex signal, performing correction of the phase error of the Hilbert-transformed complex signal according to the detected phase error, and outputting a phase-corrected signal.

Thus, phase error correction is further performed to a phase-error-corrected complex signal after Hilbert transform, so that more precise phase error correction can be performed.

It is preferable that the small phase error corrector includes: a small complex phase rotator for multiplying the Hilbert-transformed complex signal by a small phase error correction signal and outputting a resultant signal; a phase error detector for detecting the phase error based on the signal output from the small complex phase rotator and outputting the detected phase error, a low pass filter for smoothing the detected phase error output from the phase error detector and outputting the smoothed signal; and a complex signal generator for generating a complex signal corresponding to the signal output from the low pass filter and outputting the generated complex signal as the small phase error correction signal.

Thus, a circuit causing a large delay does not exist in the small phase error corrector. Accordingly, while a small phase error can be tracked, a phase error can be corrected.

It is preferable that the specific frequency component elimination filter has a narrow band elimination filter for eliminating a specific frequency component.

It is preferable that the narrow band elimination filter eliminates a component of a carrier frequency in a NTSC signal.

It is preferable that the narrow band elimination filter eliminates a direct current component.

It is preferable that the specific frequency component filter has a narrow band elimination filter of which an elimination frequency band is variable.

Effects of the Invention

In a phase error correction circuit according to the present invention, highly precise phase error correction can be performed. Therefore, degradation of a signal received by a demodulator using the phase error correction circuit can be suppressed. A waveform equalizer outputs not a complex signal but a real signal, so that increase in circuit size can be suppressed.

EXPLANATION OF REFERENCE NUMERALS 12, 52 Complex phase rotator
14 Specific frequency component elimination filter
16 Waveform equalizer
20, 40 Phase correction signal generator
22 Hilbert transformer
24, 54 Phase error detector
26, 56 Low pass filter
28, 58 Complex signal generator
32 Slicer
34 Subtracter
36 Integrator
50 Small phase error corrector

BEST MODE FOR CARRYING OUT THE INVENTION

Hereinafter, embodiments of the present invention will be described with reference to the accompanying drawings.

First Embodiment

Figure 1:
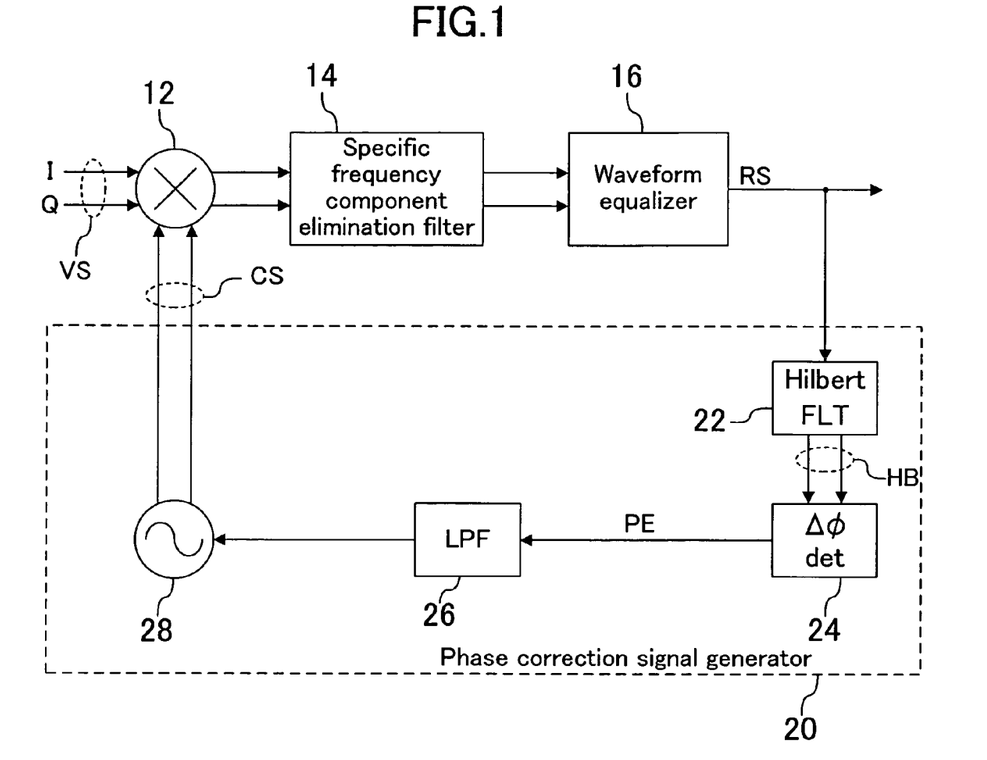
FIG. 1 is a block diagram of a phase error correction circuit according to a first embodiment of the present invention.

FIG. 1 is a block diagram illustrating a phase error correction circuit according to a first embodiment of the present invention. The phase error correction circuit of FIG. 1 includes a complex phase rotator 12, a specific frequency component elimination filter 14, a waveform equalizer 16 and a phase correction signal generator 20. The phase correction signal generator 20 includes a Hilbert transformer 22, a phase error detector 24, a low pass filter 26 and a complex signal generator 28.

An A/D converted VSB signal VS and a phase correction signal CS which is a complex signal for correcting a phase error are input to the complex phase rotator 12. The VSB signal VS is a baseband signal. The complex phase rotator 12 rotates a phase of the VSB signal VS by multiplying the VSB signal VS by the phase correction signal CS to correct a phase error of the VSB signal VS so that the phase error of the VSB signal VS is reduced. The complex phase rotator 12 outputs the phase-error-corrected VSB signal to the specific frequency component elimination filter 14.

The specific frequency component filter 14 includes, for example, one or more narrow band elimination filters. A narrow band elimination filter eliminates a frequency component of a frequency specific to the narrow band elimination filter and frequency components around the specific frequency. A notch filter is an example of narrow band elimination filters. The specific frequency component elimination filter 14 eliminates a specific frequency component from the phase-error-corrected VSB signal and outputs a resultant signal to the waveform equalizer 16.

For example, assume that the specific frequency component elimination filter 14 is configured to eliminate components of carrier frequencies in a NTCS (national television system committee) signal, i.e., a video carrier frequency, a color subcarrier frequency and a sound carrier frequency, and components around the carrier frequencies. Thus, influences of a NTSC signal on the same channel as a received VSB signal can be suppressed. Moreover, the specific frequency component elimination filter 14 is configured so as to eliminate a DC component. The specific frequency component elimination filter 14 may be configured so as to eliminate some other frequency component which has not described herein or may include a narrow band elimination filter for eliminating components in a variable frequency band.

The waveform equalizer 16 performs correction of a waveform distortion generated due to intersymbol interference and the like to the VSB signal which is a complex signal, from which a specific frequency component has been eliminated and outputs a resultant real signal, i.e., a waveform-distortion-corrected signal RS. The phase correction signal generator 20 extracts phase error information from the waveform-distortion-corrected signal RS, obtains a complex signal corresponding to the phase error information and outputs the complex signal as a phase correction signal CS to the complex phase rotator 12.

The phase correction signal generator 20 will be described. The Hilbert transformer 22 performs Hilbert transform to the waveform-distortion-corrected signal RS and outputs a complex signal HB obtained through Hilbert transform to the phase error detector 24. The phase error detector 24 detects a phase error from the complex signal HB and outputs a result of the detection as phase error information PE to the low pass filter 26.

The low pass filter 26 smoothes the phase error information PE and outputs the smoothed phase error information PE to the complex signal generator 28. The complex signal generator 28 generates, based on an output of the low pass filter 26, the phase correction signal CS for correcting a phase error of the VSB signal VS and outputs the generated phase correction signal CS to the complex phase rotator 12. The phase correction signal CS is a complex conjugate signal of the detected phase error.

Now, details of phase error detection will be discussed. Assume that symbol information mapped in a transmitter exists in each of in-phase component and quadrature component of the complex signal HB. When an input complex signal HB is I+jQ and an original complex signal is $D_i+jD_q$, a phase error $P_{err}$ between the signals can be expressed by the following equations:

$$P_{err}=I*(D_i-I)-Q*(D_q-Q)+j(Q*(D_i-I)-I*(D_q-Q))$$

When respective symbol errors of an in-phase component I and a quadrature component Q of the complex signal HB are $S_i=(D_i-I)$ and $S_q=(D_q-Q)$, the following equation holds:

$$P_{err}=I*S_iQ*S_q+j(Q*S_i-I*S_q)$$

When a phase error is approximated by a size of the quadrature component, the following equation holds:

$$P_{err} \approx Q*S_i - I*S_q$$

Then, since a symbol error of the quadrature component does not exist in the VSB signal, the following equation holds:

$$P_{err}=Q*S_i$$

Then, the phase error detector 24 calculates a difference between the in-phase component I of the complex signal HB and the original signal symbol value $D_i$ of the VSB signal estimated from the in-phase component and detects as the phase error $P_{err}$ a result from multiplication of an obtained value for the difference and the quadrature component Q.

Figure 2:
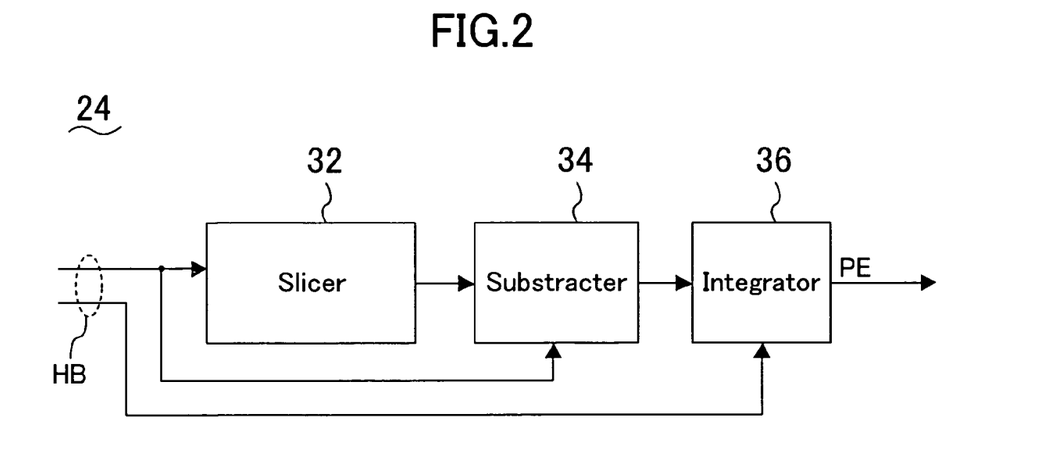
FIG. 2 is a block diagram illustrating a configuration of a phase error detector of FIG. 1.

FIG. 2 is a block diagram illustrating a configuration of the phase error detector 24 of FIG. 1. The phase error detector 24 of FIG. 2 includes a slicer 32, a subtracter 34 and an integrator 36. The slicer 32 estimates the original signal symbol value $D_i$ of the VSB signal from the in-phase component of the Hilbert-transformed complex signal HB and outputs the original signal symbol value $D_i$ to the subtracter 34.

The subtracter 34 obtains a difference $S_i$ between the symbol value $D_i$ and the in-phase component I of the complex signal HB and outputs the obtained difference $S_i$ to the integrator 36. The integrator 36 multiplies the difference $S_i$ and the quadrature component Q of the complex signal HB and outputs a result of the multiplication as the phase error information PE.

As described above, in the phase error correction circuit of FIG. 1, a VSB signal which has been phase-error-corrected and is output from the complex phase rotator 12 is a signal from which a frequency error, i.e., an integral of a phase error has been eliminated. Therefore, the specific frequency component elimination filter 14 can eliminate a specific frequency component to be eliminated at high accuracy.

Also, even though only a real signal is output from the waveform equalizer 16, a phase of the VSB signal VS is rotated by multiplying the input VSB signal VS by the phase correction signal CS. Thus, highly precise phase error correction can be achieved. Therefore, degradation of a signal received by a demodulator using the phase error correction circuit can be suppressed.

Second Embodiment

Figure 3:
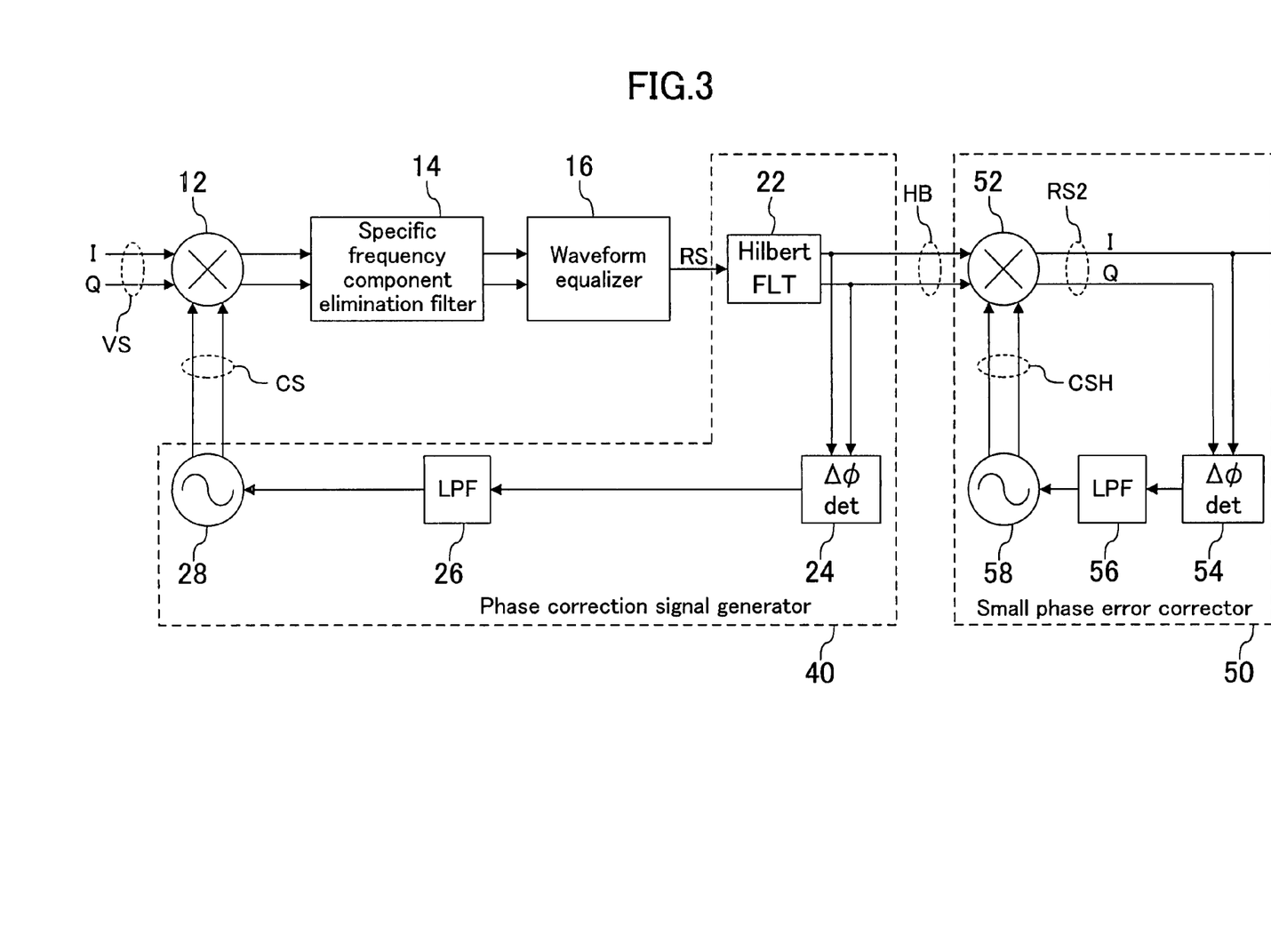
FIG. 3 is a block diagram of a phase error correction circuit according to a second embodiment of the present invention.

FIG. 3 is a block diagram illustrating a phase error correction circuit according to a second embodiment of the present invention. The phase error correction circuit of FIG. 3 includes a complex phase rotator 12, a specific frequency component elimination filter 14, a waveform equalizer 16, a phase correction signal generator 40 and a small phase error corrector 50. The phase correction signal generator 40 includes the same components as those of the phase correction signal generator 20 of FIG. 1. The small phase error corrector 50 includes a complex phase rotator 52, a phase error detector 54, a low pass filter 56 and a complex signal generator 58. Each member also described in the first embodiment is identified by the same reference numeral, and therefore the description thereof will be omitted.

The phase error correction circuit of FIG. 1 includes in its loop a waveform equalizer having a large number of taps. Thus, in the phase error correction circuit, a large loop delay is caused and a response performance of the phase error correction circuit with respect to a small phase change is not great. To reduce small phase change, the small phase error corrector 50 corrects a complex signal HB generated in the phase correction signal generator 40 and outputs the corrected complex signal HB.

A quadrature component of the complex signal HB is generated from the waveform-distortion-corrected signal RS which is a real signal by Hilbert transform. That is, when a small phase error change is caused, a complex signal is generated from a real signal including the small phase error change. In this case, an error in a frequency component around a DC is increased due to a frequency characteristic of a VSB signal. However, such an error does not occur when a phase error is 0 degree and a maximum error occurs when a phase error is 90 degrees. Generation of a complex signal from a real signal has very small influence on detection of a small phase change.

The Hilbert-transformed complex signal HB generated by the Hilbert transformer 22 and a small phase error correction signal CSH which is a complex signal for correcting a phase error are input to the complex phase rotator 52. The complex phase rotator 52 rotates a phase of the complex signal HB by multiplying the complex signal HB by a small phase error correction signal CSH to correct a phase error of the complex signal HB so that the phase error is reduced. The complex phase rotator 52 outputs the phase-error-corrected complex signal RS2 to the phase error detector 54. An in-phase component of the complex signal RS2 is output to the outside of the phase error correction circuit of FIG. 3.

The phase error detector 54 is the same as the phase error detector 24 of FIG. 1. The low pass filter 56 is the same as the low pass filter 26 of FIG. 1, except that a different parameter is used. Therefore, the detailed description thereof will be omitted.

The complex signal generator 58 generates, based on an output of the low pass filter 56, the small phase error correction signal CSH for correcting a phase error of the complex signal HB and outputs the small phase error correction signal CSH to the complex phase rotator 52. The small phase error correction signal CSH is a complex conjugate signal of a detected phase error.

As has been described, in the phase error correction circuit of FIG. 3, a circuit causing a large delay does not exist in a loop of the small phase error corrector 50. Accordingly, fast changes in phase noise and a small phase error can be tracked and a phase error can be corrected.

INDUSTRIAL APPLICABILITY

As has been described, according to the present invention, highly precise phase error correction can be performed and also increase in circuit size can be suppressed. Therefore, the present invention is useful as a demodulator for demodulating a VSB modulated signal.

The invention claimed is:

1. A phase error correction circuit comprising:
   a complex phase rotator for multiplying an input VSB (vestigial-sideband) signal by a phase correction signal and outputting a resultant signal;
   a specific frequency component elimination filter for eliminating a specific frequency component from the signal output from the complex phase rotator and outputting a resultant signal;
   a waveform equalizer for performing waveform distortion correction to the signal output from the specific frequency component elimination filter and outputting a resultant signal; and
   a phase correction signal generator for detecting a phase error based on the signal output from the waveform equalizer and outputting a complex signal corresponding to the detected phase error as the phase correction signal.

2. The phase error correction circuit of claim 1, wherein the waveform equalizer receives a complex signal from the specific frequency component elimination filter and outputs a real signal as the resultant signal obtained from the waveform distortion correction.

3. The phase error correction circuit of claim 2, wherein the phase correction signal generator includes a Hilbert transformer for performing Hilbert transform to the signal output from the waveform equalizer and outputting a complex signal obtained from the Hilbert transform and detects the phase error based on the Hilbert-transformed complex signal.

4. The phase error correction circuit of claim 3, wherein the phase correction signal generator further includes:
   a phase error detector for detecting the phase error based on the Hilbert-transformed complex signal and outputting the detected phase error;
   a low pass filter for smoothing the detected phase error output from the phase error detector and outputting the smoothed signal; and
   a complex signal generator for generating a complex signal corresponding to the signal output from the low pass filter and outputting the generated complex signal as the phase correction signal.

5. The phase error correction circuit of claim 4, wherein the phase error detector includes:
   a slicer for estimating an original signal symbol value of the VSB signal from an in-phase component of an input complex signal;
   a subtracter for obtaining a difference between an in-phase component of the Hilbert-transformed complex signal and the estimated signal symbol value output from the slicer; and
   an integrator for obtaining a product of the difference output from the subtracter and a quadrature component of the Hilbert-transformed complex signal and outputting a resultant product as the phase error.

6. The phase error correction circuit of claim 3, further comprising a small phase error corrector for detecting a phase error based on the Hilbert-transformed complex signal, performing correction of the phase error of the Hilbert-transformed complex signal according to the detected phase error, and outputting a phase-corrected signal.

7. The phase error correction circuit of claim 6, wherein the small phase error corrector includes:
   a small complex phase rotator for multiplying the Hilbert-transformed complex signal by a small phase error correction signal and outputting a resultant signal;
   a phase error detector for detecting the phase error based on the signal output from the small complex phase rotator and outputting the detected phase error;
   a low pass filter for smoothing the detected phase error output from the phase error detector and outputting the smoothed signal; and
   a complex signal generator for generating a complex signal corresponding to the signal output from the low pass filter and outputting the generated complex signal as the small phase error correction signal.

8. The phase error correction circuit of claim 1, wherein the specific frequency component elimination filter has a narrow band elimination filter for eliminating a specific frequency component.

9. The phase error correction circuit of claim 8, wherein the narrow band elimination filter eliminates a component of a carrier frequency in a NTSC (national television system committee) signal.

10. The phase error correction circuit of claim 8, wherein the narrow band elimination filter eliminates a direct current component.

11. The phase error correction circuit of claim 1, wherein the specific frequency component elimination filter has a narrow band elimination filter of which an elimination frequency band is variable.

* * * * *

UNITED STATES PATENT AND TRADEMARK OFFICE
CERTIFICATE OF CORRECTION

PATENT NO. : 7,649,962 B2 Page 1 of 1
APPLICATION NO. : 10/578005
DATED : January 19, 2010
INVENTOR(S) : Tatsuji Ishii It is certified that error appears in the above-identified patent and that said Letters Patent is hereby corrected as shown below:

Title Page
In Item "(86) § 371 (c)(1), (2), (4) Date," the date "Apr. 6, 2007" should be --May 3, 2006--.

Signed and Sealed this
Fifteenth Day of March, 2011

David J. Kappos
*Director of the United States Patent and Trademark Office*